UNITED STATES PATENT OFFICE.

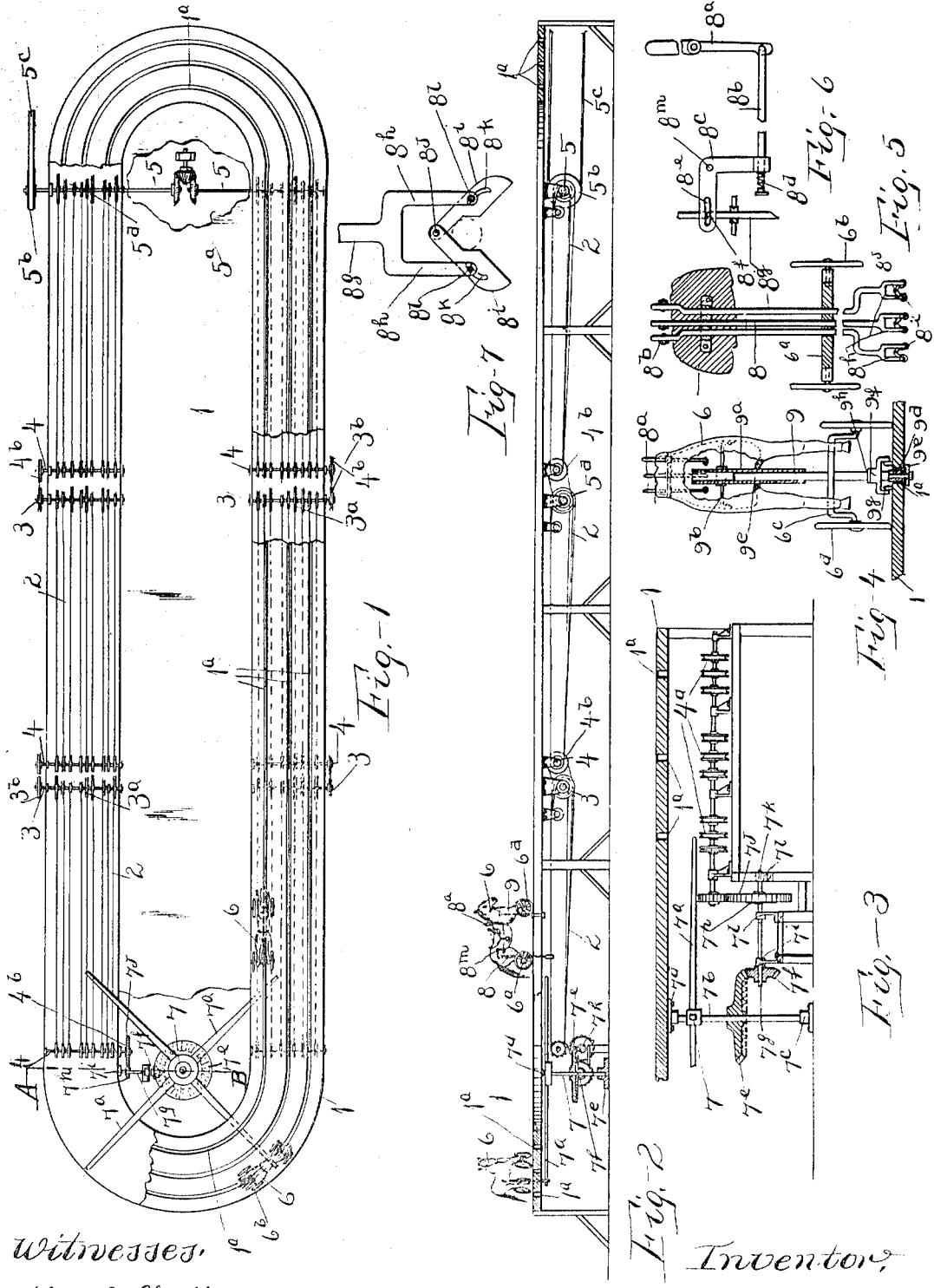

REYNOLD SHUYLER, OF SAN DIEGO, CALIFORNIA.

AMUSEMENT RACING DEVICE.

1,072,181. Specification of Letters Patent. Patented Sept. 2, 1913.

Application filed February 3, 1913. Serial No. 745,771.

*To all whom it may concern:*

Be it known that I, REYNOLD SHUYLER, a citizen of the United States, and a resident of San Diego, county of San Diego, and State of California, have invented certain new and useful Improvements in Amusement Racing Devices, of which the following is a specification.

My invention relates to amusement racing devices in which there are a plurality of contesting apparatuses, the speed of each of which may be controlled by the rider or operator of said apparatus, and the principal objects of my invention are, first, to provide a device of this kind that will give each rider an equal chance of winning; second, to provide a device in which each apparatus is provided with mechanism that the rider can easily operate so as to adjust the speed of said apparatus; third, to provide a device that has a unique and novel amusement feature and that is neat in appearance.

With these and other objects in view, as will hereinafter appear, my invention consists of certain novel features of construction, combination and arrangement of parts as will be hereinafter described in detail and particularly set forth in the appended claims, reference being had to the accompanying drawings and to the characters of reference thereon, which form a part of this specification, in which:—

Figure 1, is a plan view of my device complete with sections of the floor broken away to show the mechanism beneath, Fig. 2 is a side elevational view thereof shown partly in section, Fig. 3 is a fragmentary sectional view through A—B of Fig. 1, showing the mechanism for operating the sweeps, Fig. 4 is a front elevational view of a horse with portions broken away to show the guides in connection therewith, Fig. 5 is an elevational view of the clutch mechanism in connection with a fragmentary portion of a horse, Fig. 6 is a fragmentary elevational view of the lever arrangement for operating one of the clutches, and Fig. 7 is an enlarged detail view of the clutch mechanism.

Similar characters of reference refer to similar parts throughout the several views.

In the drawings I have shown a device adapted for three racers, but it may be built for any number desired. I will, therefore, describe the one as shown.

The platform 1, cables 2, shafts 3, shafts 4, main driving shafting 5, horses 6, sweep mechanism 7, clutch mechanism 8, guiding mechanism 9, constitute the principal parts of my device.

The platform 1 is preferably loop shaped and constructed as shown best in Figs. 1 and 2, and is made of any suitable material, preferably of wood. It is provided with three slots $1^a$, one of which is located directly beneath each of the horses 6 and extends the full length of the loop in the said platform. The platform 1 is provided with a main shafting 5 which is divided by the differential gears $5^a$, and on the one end of said shafting is provided a pulley $5^b$ upon which a driving belt $5^c$ is mounted which may be operated by any driving mechanism. This shafting 5 is also provided near each end with three sets of sheaves $5^d$ and each set consists of three sheaves of different diameters which are rigidly attached to said shafting 5. The center sheave of each set is located directly beneath one of the slots $1^a$ of the platform 1. Upon each of these sheaves $5^d$ is mounted an endless cable 2 which extends to and around the sheaves $4^a$. These sheaves $4^a$ are loosely mounted on the shaft 4 with the exception of one which is rigidly attached to the shaft 4. On one end of this shaft 4 is rigidly mounted a transmission sheave $4^b$ which will operate the corresponding transmission sheave $3^b$ which is rigidly mounted on one end of the shaft 3. This shaft 3 is provided with three sets of sheaves $3^a$. Each set consists of three sheaves of different diameters, each of which operates an endless cable 2, which is similar to those on the shafting 5. These sheaves are of various sizes and differently arranged so that the corresponding sheaves on each of said shafts will operate their cables at a different speed. The other sections of cables are operated in a similar manner throughout the entire device.

The sweeps 7 are operated by means of a beveled gear in connection with one of the shafts 4. They may be operated in many different ways, but I prefer the construction as shown best in Figs. 1, 2 and 3, and as described in the following description: These sweeps or arms 7ª are rigidly attached centrally near the top end of a shaft 7ᵇ and each extend out a sufficient distance to overlap the slot 1ª which is nearest the outer edge of the platform 1. The bottom end of the shaft 7ᵇ is pivoted in the gearing 7ᶜ and is provided at the top with a bearing 7ᵈ. Rigidly attached to the shaft 7ᵇ near its center is a beveled gear 7ᵉ which is revolved by another beveled gear 7ᶠ, which is rigidly mounted on one end of the shaft 7ᵍ. On the other end of this shaft is rigidly mounted a gear wheel 7ʰ. This shaft is supported by the bearings 7ⁱ. This gear wheel 7ʰ is revolved by a gear wheel 7ʲ which is rigidly mounted on a shaft 7ᵏ which is supported by the bearings 7ˡ. This gear wheel 7ʲ is in turn revolved by the gear wheel 4ᵇ which is rigidly mounted on one end of the shaft 4. This shaft 4 is similar to the other shafts 4 that are provided with a plurality of sheaves 4ª which are all loosely mounted except one, this being rigidly attached so as to revolve the shaft 4, thus turning the gear wheel 4ᵇ. It will be here noted that this sweep mechanism is for the purpose of moving the horses around the curved portion of the platform, but said mechanism may be eliminated and the horses would go around by reason of their momentum, especially if the one side of the platform was at a higher elevation than the other at that end which would be easily accomplished by building said platform in sections, which is the preferable construction. The horse 6 is of the ordinary type used for such purposes, its rear legs being rigidly attached to a shaft 6ª on the ends of which the wheels 6ᵇ are pivotally mounted as shown best in Fig. 5. The front legs of the horse 6 are pivotally mounted to a crank shaft 6ᶜ to which the wheels 6ᵈ are rigidly attached. This horse is provided with a guide 9 a sufficient distance back from the front of said horse so as to clear the crank shaft 6ᶜ as it rotates. This guide consists of a tube 9ª which is rigidly attached to the inside of the horse by means of a support 9ᵇ and is adapted for the staff 9ᶜ. The lower end of the staff 9ᶜ is provided with a vertically mounted roller 9ᵈ that is of sufficient diameter as to fit loosely in the slot 1ª of the platform 1 and is held from slipping out by the collar 9ᵉ of the staff 9ᶜ. Near the bottom of said staff 9ᶜ is a roller support 9ᶠ which is provided with a plurality of horizontally mounted rollers 9ᵍ and is held against the platform by means of the collar 9ʰ, thus as the front of the horse 6 is moved up and down by the rotation of the crank shaft 6ᵉ the staff 9ᶜ will reciprocate in the tubing 9ª, and, the lower end being held in the slot 9ª of the platform, will guide the horse over said platform 1. This horse is also provided with a clutch mechanism 8 which consists of three levers 8ª which are pivotally mounted near the neck of said horse 6, as shown best in Figs. 2 and 4. To the lower ends of these three levers 8ª are pivotally connected three connecting rods 8ᵇ which extend to and through the arms 8ᶜ and they are provided with tension springs 8ᵈ. These arms 8ᶜ are bent as shown best in Figs. 2 and 6, their horizontal portions being provided with slots 8ᵉ which are adapted for the studs 8ᶠ of the staffs 8ᵍ, and said arms 8ᶜ are pivotally mounted on the horse at 8ᵐ. These staffs are shaped as shown best in Fig. 5 and are provided at their lower ends with the forks 8ʰ. The forks of each staff being directly over one of the three cables directly beneath the horse 6 and each prong of the fork is provided with a cam lever 8ⁱ, the upper ends of which are pivoted together by means of the pins 8ʲ and near the lower ends are provided with slots 8ᵏ which are adapted for the pins 8ˡ which are rigidly attached to the prongs of the forks 8ʰ so that when the staffs 8ᵍ are forced downward and the upper part of the cam levers come in contact with the cable beneath they will be forced upward, thus causing the inner surface of these cam levers to clutch the cable rigidly, all of which is shown best in Fig. 7.

It is obvious that if the rider of said horse pulls back on one of said levers the clutch will catch the cable directly beneath it; that the said cables being driven continuously and the clutch being attached rigidly to the horse the horse will be forced to travel the same speed as the cable; that the speed of the horse may be varied by the different clutches engaging with the various speed cables.

Though I have shown and described a particular detailed construction, combination and arrangement of parts, I do not wish to be limited to this particular construction and arrangement, but desire to include in the purview of my invention the principles and construction substantially as set forth in the appended claims.

It will be readily seen that with this construction there is provided an amusement racing device in which each rider has an equal chance of winning; that the device will provide new amusement features, that the speed of each apparatus can be governed by the rider upon his operating the levers provided; that there is provided an amusement racing device that is easily operated and neat in appearance; that there is provided an amusement racing device that will give all the sensations of a real horse race.

Having thus described my invention, what I claim as new and desire to secure by Letters Patent, is:—

1. A racing device comprising a plurality of tracks side by side, a plurality of various speed moving cables mounted below each of said tracks, a plurality of racing apparatuses adapted to be readily attached to and detached from any of said cables, and means in connection with and operated from any one of said racing apparatuses for attaching and detaching the same.

2. In a racing device, the combination of a loop shaped platform provided with a plurality of grooves therein, a plurality of variable speed cables mounted beneath each of said grooves, a racing device adapted to run on said platform over each of said grooves, a means in connection with said racing device adapted to facilitate its engagement with any one of said cables beneath said groove and means for operating said cables.

3. In a racing device, the combination of a loop shaped platform provided with a plurality of grooves therein, a plurality of variable speed cables mounted beneath each of said grooves, a racing device adapted to run on said platform over each of said grooves, a means in connection with said racing device adapted to facilitate its engagement with any one of said cables beneath said groove, means for operating said cables and a sweep means adapted to engage with said racing devices for moving said racing devices around the end of said loop.

4. In a racing device, the combination of a loop shaped platform provided with a plurality of grooves therein, a plurality of variable speed cables mounted beneath each of said grooves, a racing device adapted to run on said platform over each of said grooves, a means in connection with said racing device adapted to facilitate its engagement with any one of said cables beneath said grooves, means for revolving said cables, a sweep means adapted to engage with said racing devices for moving said racing devices around the end of said loop, and means for operating said sweep means in connection with said cables.

5. In a racing device the combination of a platform provided with a plurality of grooves therein, a plurality of shafts mounted beneath said platform, a plurality of sets of various sized sheaves mounted beneath each of said grooves on said shafts, cables mounted longitudinally along said platform on each alined set of sheaves and a racing device for each of said grooves adapted to be guided by said groove and means for facilitating its engagement with any one of said cables beneath said groove.

6. In a racing device the combination of a platform provided with a plurality of grooves, a plurality of shafts mounted beneath said platform, a plurality of sets of various sized sheaves mounted beneath each of said grooves on said shafts, cables mounted longitudinally along said platform on each alined set of sheaves, a racing device for each of said grooves adapted to be guided by said groove, means for facilitating its engagement with any one of said cables beneath said groove and means for simultaneously revolving said shafts.

7. In a racing device the combination of a platform provided with a plurality of grooves, a plurality of shafts mounted beneath said platform, a plurality of sets of various sized sheaves mounted beneath each of said grooves on said shafts, cables mounted longitudinally along said platform on each alined set of sheaves and a racing device for each of said grooves adapted to be guided by said groove, means for facilitating its engagement with any one of said cables beneath said groove, means for simultaneously revolving said shafts, and a means in connection with said racing device for causing the same to intermittently rise and lower.

8. In a racing device the combination of a platform provided with a plurality of grooves, a plurality of shafts mounted beneath said platform, a plurality of sets of various sized sheaves mounted beneath each of said grooves on said shafts, cables mounted longitudinally along said platform on each alined set of sheaves and a racing device for each of said grooves adapted to be guided by said groove, means for facilitating its engagement with any one of said cables beneath said groove, means for simultaneously revolving said shafts, means in connection with said racing device for causing the same to intermittently rise and lower, and a separate means adapted to engage with said racing devices for moving them at certain points along said platform.

9. In a racing device the combination of a platform provided with a plurality of grooves, a plurality of shafts mounted beneath said platform, a plurality of sets of various sized sheaves mounted beneath each of said grooves on said shafts, cables mounted longitudinally along said platform on each alined set of sheaves and a racing device for each of said grooves adapted to be guided by said groove, means for facilitating its engagement with any one of said cables beneath said groove, means for simultaneously revolving said shafts, means in connection with said racing device for causing the same to intermittently rise and lower and a sweep means adapted to move said racing devices along said platform at one end thereof.

10. In a racing device the combination of a platform provided with a plurality of grooves, a plurality of shafts mounted beneath said platform, a plurality of sets of various sized sheaves mounted beneath each of said grooves on said shafts, cables mounted longitudinally along said platform on each alined set of sheaves and a racing device for each of said grooves adapted to be guided by said groove, means for facilitating its engagement with any one of said cables under said groove, means for simultaneously revolving said shafts, means in connection with said racing device for causing the same to intermittently rise and lower, a sweep means adapted to move said racing device along said platform and means for facilitating the operation of said sweep device.

In testimony whereof, I have hereunto subscribed my name in the presence of two subscribing witnesses.

REYNOLD SHUYLER.

Witnesses:
ABRAM B. BOWMAN,
ELMER E. RODABAUGH.